(12) United States Patent
Giamati

(10) Patent No.: US 10,690,280 B2
(45) Date of Patent: Jun. 23, 2020

(54) HIGH EFFICIENCY AIR HEATER

(71) Applicant: Goodrich Corporation, Charlotte, NC (US)

(72) Inventor: Michael John Giamati, Akron, OH (US)

(73) Assignee: Goodrich Corporation, Charlotte, NC (US)

( * ) Notice: Subject to any disclaimer, the term of this patent is extended or adjusted under 35 U.S.C. 154(b) by 33 days.

(21) Appl. No.: 16/124,995

(22) Filed: Sep. 7, 2018

(65) Prior Publication Data
US 2019/0072222 A1   Mar. 7, 2019

Related U.S. Application Data

(60) Provisional application No. 62/555,422, filed on Sep. 7, 2017.

(51) Int. Cl.
| | | |
|---|---|---|
| *F16L 53/34* | (2018.01) | |
| *H05B 3/58* | (2006.01) | |
| *B64D 13/02* | (2006.01) | |
| *F28D 15/02* | (2006.01) | |
| *B64D 13/08* | (2006.01) | |

(52) U.S. Cl.
CPC ............ *F16L 53/34* (2018.01); *H05B 3/58* (2013.01); *B64D 13/02* (2013.01); *B64D 13/08* (2013.01); *F28D 15/0275* (2013.01)

(58) Field of Classification Search
CPC . F16L 53/34; H05B 3/58; H05B 6/108; Y10T 137/6606

USPC ........... 138/33, 109; 137/341; 219/530, 629; 392/491, 478, 485
See application file for complete search history.

(56) References Cited

U.S. PATENT DOCUMENTS

| | | | | |
|---|---|---|---|---|
| 3,126,469 | A * | 3/1964 | Feldmann et al. ....... | H05B 3/06 392/451 |
| 3,777,117 | A * | 12/1973 | Othmer .................. | F24H 1/121 392/469 |
| 4,192,988 | A * | 3/1980 | Pederson, Jr. ........... | A61L 2/04 134/19 |
| 4,553,023 | A * | 11/1985 | Jameson ................. | F16L 53/38 392/472 |
| 4,976,397 | A | 12/1990 | Rudolph et al. | |
| 5,714,738 | A | 2/1998 | Hauschulz et al. | |
| 7,919,733 | B2 * | 4/2011 | Ellis ........................ | H05B 3/50 219/544 |
| 8,414,278 | B2 * | 4/2013 | Okada ................... | B29C 33/046 219/629 |
| 8,863,782 | B2 * | 10/2014 | Ferrone ................. | A01K 7/027 138/33 |
| 9,423,185 | B2 | 8/2016 | Yamakage et al. | |
| 2008/0271801 | A1 * | 11/2008 | Sonderegger .......... | F16L 53/38 138/33 |
| 2013/0213487 | A1 * | 8/2013 | Qu .......................... | F16L 53/38 137/13 |
| 2015/0053293 | A1 * | 2/2015 | Ophaug ................ | F16L 11/083 138/33 |

(Continued)

*Primary Examiner* — Patrick F Brinson
(74) *Attorney, Agent, or Firm* — Kinney & Lange, P.A.

(57) ABSTRACT

An air supply line includes an aluminum tube with a one inch diameter, a network of fins located within the aluminum tube to promote heat exchange, and a wall structure containing a heater wrapped around the aluminum tube to allow for temperature control and prevent freezing upstream of valves.

20 Claims, 5 Drawing Sheets

(56) References Cited

U.S. PATENT DOCUMENTS

| | | |
|---|---|---|
| 2015/0219264 A1 | 8/2015 | Tailor et al. |
| 2015/0260326 A1* | 9/2015 | Westmeier .............. F16L 53/38 138/33 |
| 2019/0323728 A1* | 10/2019 | Base ........................ F28F 1/40 |

* cited by examiner

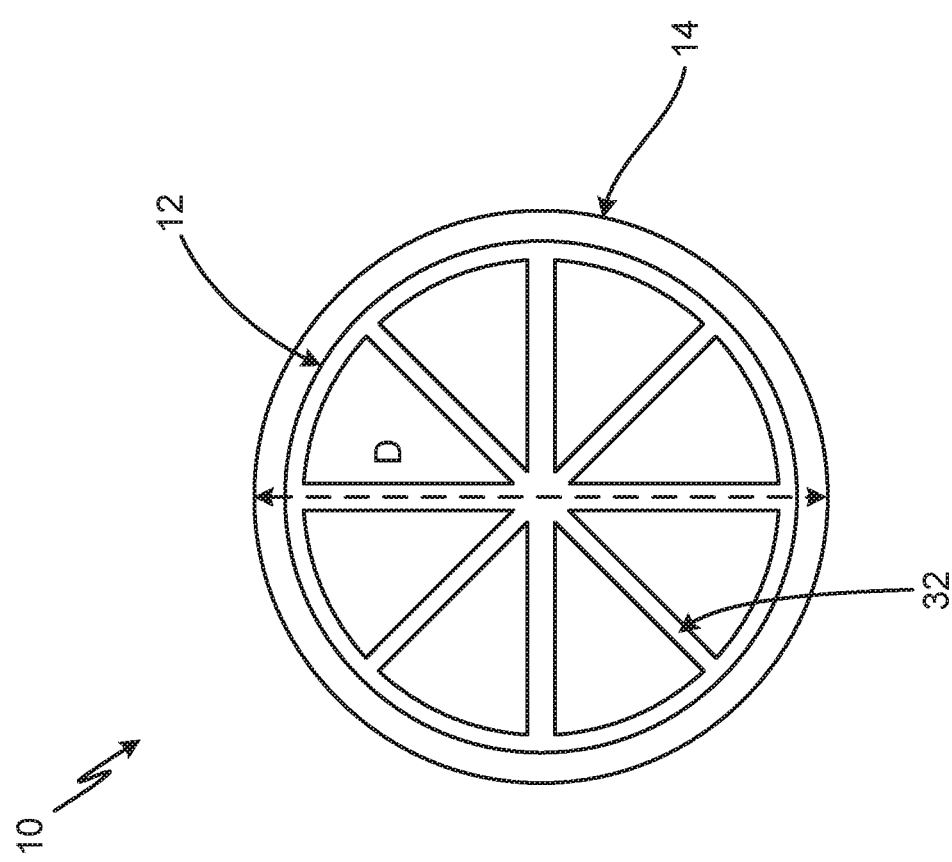

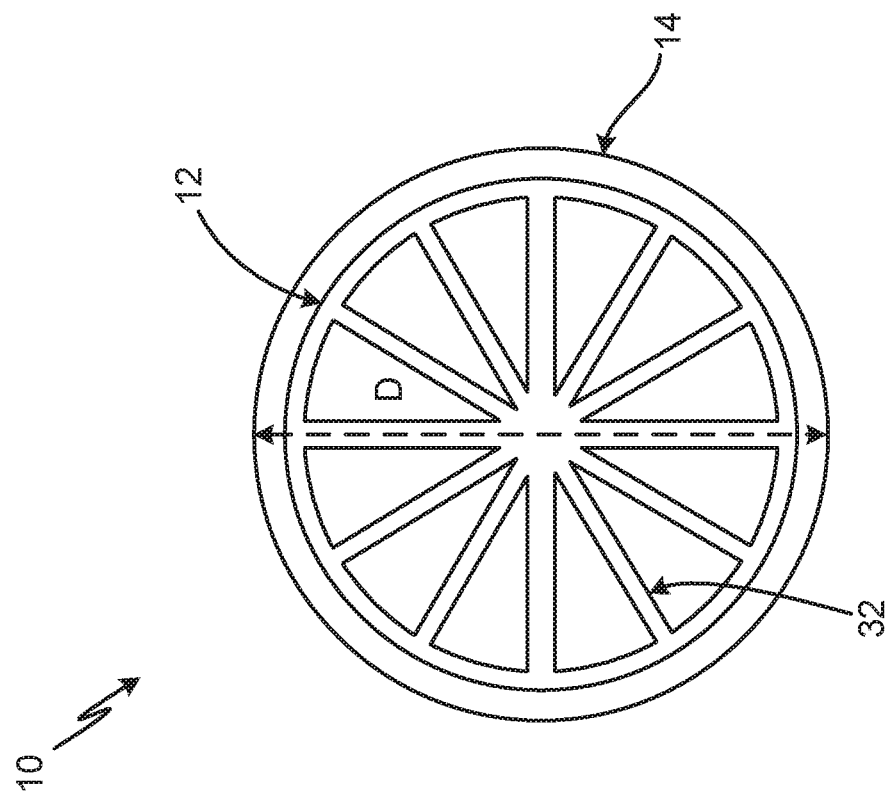
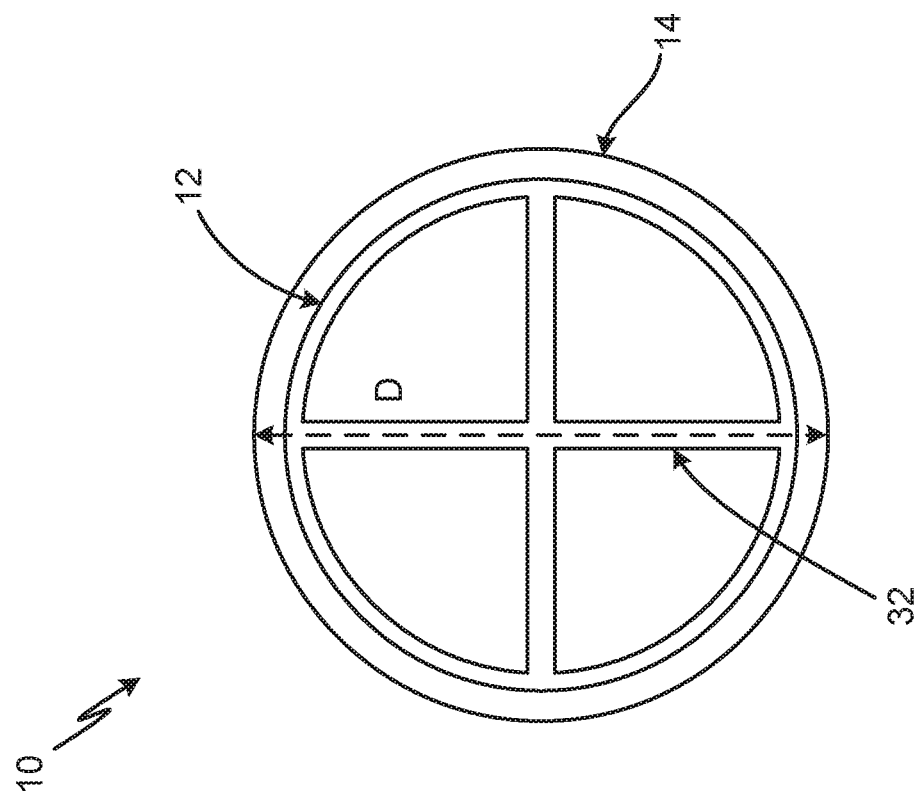
Fig. 1D
Fig. 1C

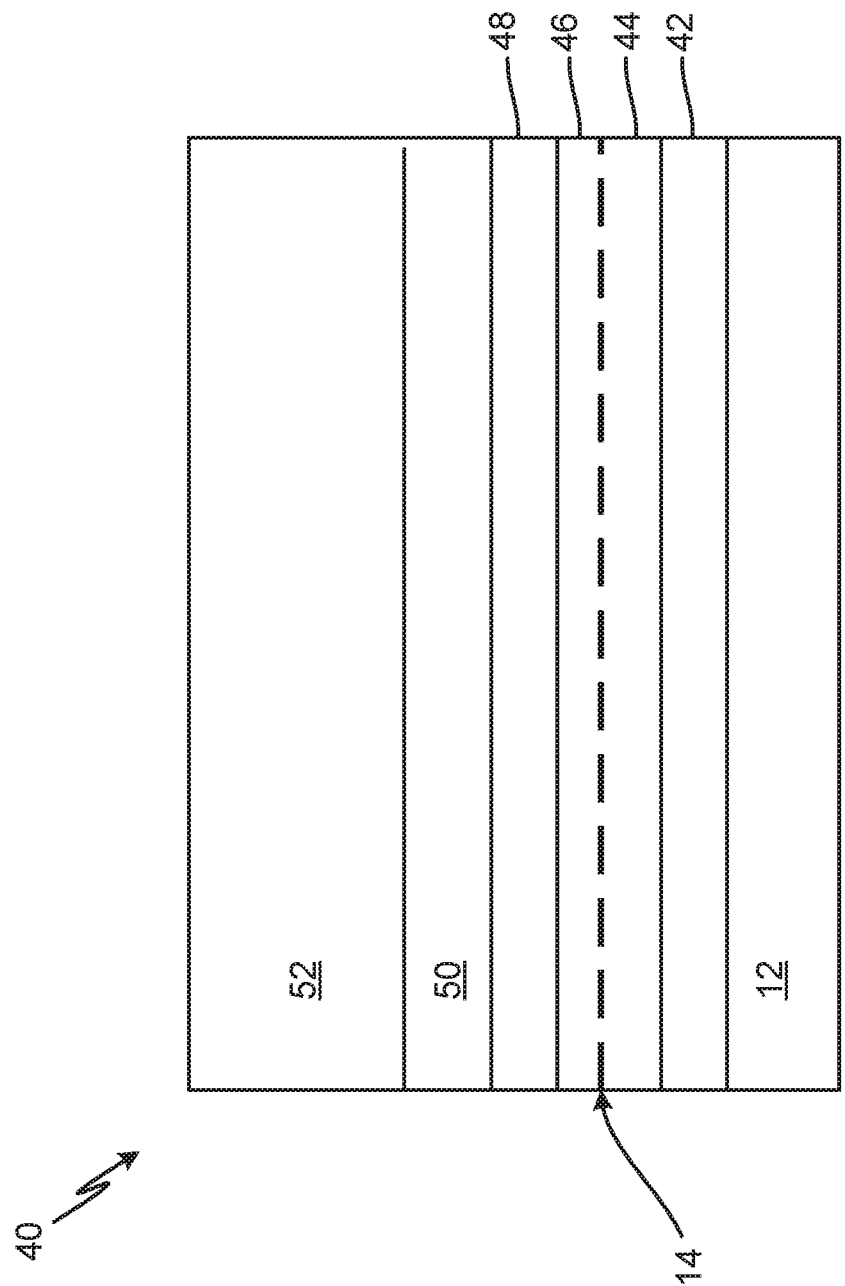

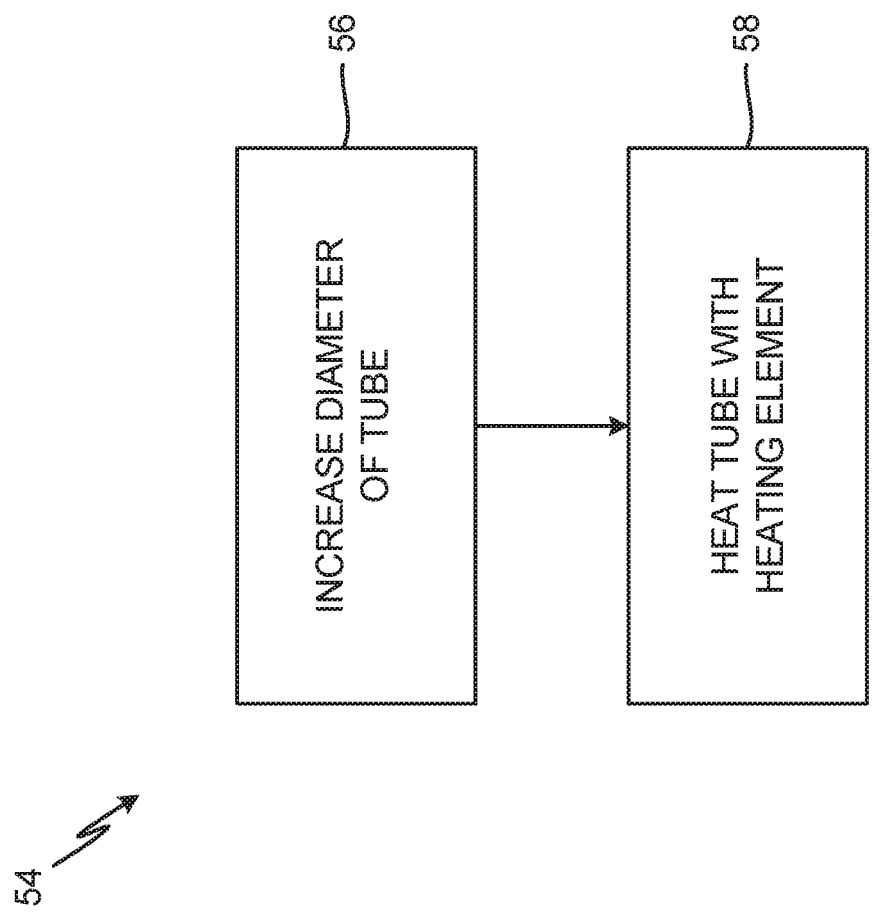

HIGH EFFICIENCY AIR HEATER

CROSS-REFERENCE TO RELATED APPLICATION(S)

This application claims the benefit of U.S. Provisional Application No. 62/555,422 filed Sep. 7, 2017 for "HIGH EFFICIENCY AIR HEATER" by M. Giamati.

BACKGROUND

Servo valves are electrically operated valves used in aircraft to control how pressurized air is ported to an actuator. Typically, servo valves allow for precise control of pressure, force, position and velocity. However, when servo valves are exposed to cold conditions, they do not work as efficiently. Specifically, with a pressurized air feed line used to actuate a servo valve, moisture in the supply line freezes upstream of the servo valve and blocks the supply line. Ice particles are also passed through the supply line and can be injected by the servo valve.

SUMMARY

An air supply line includes a tube with a diameter of at least one inch, a network of fins located within the tube, and a heater wrapped around the tube.

A method of temperature controlling an air flow in an air supply line includes decreasing velocity of the air flow by increasing the diameter of the air supply line to at least one inch, and heating the air supply line with a metallic heater element, the heater element wrapped around the air supply line.

BRIEF DESCRIPTION OF THE DRAWINGS

FIGS. 1A-1D are perspective views of an air heater.

FIG. 2 is a cross section schematic view of a wall of an air heater.

FIG. 3 is a flow chart depicting a method of making an air heater.

DETAILED DESCRIPTION

Figure 1A:
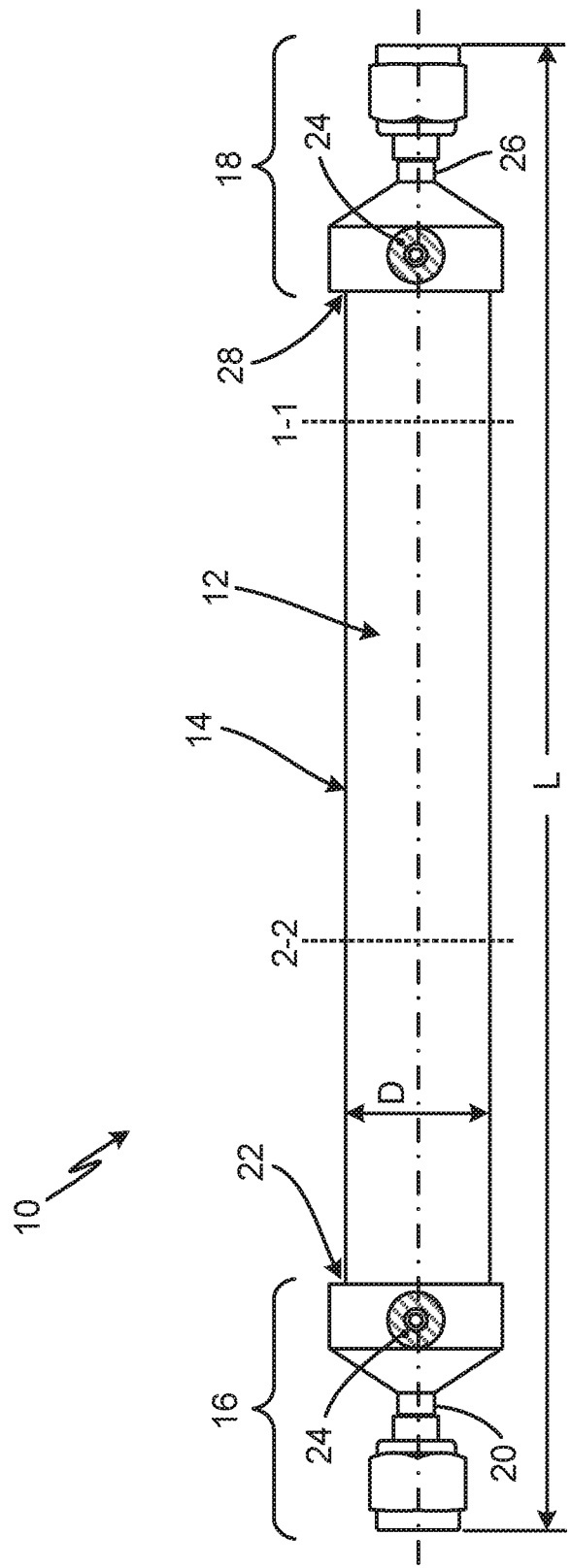

Cold temperature operation of supply lines and servo valves in aircraft create complications, including feed air freezing upstream of the servo valve, and ice particles being pumped by the servo valve into the system. Traditional 0.25 inches (0.64 centimeters) diameter feed air supply lines have high velocity air flow and small diameter. An air heater in combination with a larger diameter supply line can rectify these issues.

FIGS. 1A-1B are perspective views of feed air supply line 10. Air supply line 10 includes aluminum tube 12 with diameter D, which air heater 14 is wrapped around. Air supply line 10 runs from inlet 16 to outlet 18, and has length L. Air supply line 10 dissipates wattage in the form of heat into the air stream with maximum temperature controlled by an outside thermostat (not pictured). A wattage dissipation raises bulk airflow temperature, which is a function of wattage, flow rate, and design efficiency.

Aluminum tube 12 has a diameter D of at least one inch (2.54 centimeters) to decrease airflow velocity through air supply line 10. Tube 12 can alternatively be made of stainless steel, titanium, or other suitable metallic materials. Increasing diameter D allows for decreased airflow velocity, thus, air spends more time in a heated portion of tube 12, increasing heat transfer efficiency. Decreased airflow velocity promotes heat transfer into the air stream. Aluminum tube 12 has internal fins 32 to promote heat within the air stream. Internal fins 32 act as an ice screen and pull heat from the outer heated perimeter and dissipate this heat to the center of the airstream to maximize heating efficiency. The design of tube 12 allows for ice particles and moisture to settle out into a larger diameter chamber and internal fins 32.

Heater 14 is wrapped around aluminum tube 12. Heater 14 is a resistive metallic alloy, and is thermally conductive, transferring heat into aluminum tube 12. Heater 14 can be made of, for example, a nick-copper alloy, stainless steel, Inconel, or other copper alloys. In FIG. 1, heater 14 is a lamination of a nickel-copper resistive, acrylic adhesive, and polyimide dielectric material welded to tube 12 with acrylic pressure sensitive adhesive. Heater 14 is attached to aluminum tube 12 by a pressure sensitive adhesive and a first polyimide layer. Heater 14 is covered by a second polyimide layer, a shrink jacket, and a thermal isolation layer. These are discussed in more detail with reference to FIG. 2.

Air supply line 10 has a length L of 10.3 inches (26.16 centimeters) from inlet 16 to outlet 18. Air is heated in air heater 12 along 6.5 inches (16.51 centimeters) in the center of length L of air supply line 10. Inlet 16 includes traditional 0.25" diameter tube section 20 connected to aluminum tube 12 by diverging tube section 22. Inlet 16 also includes electrically conductive earthing and bonding area 24. Outlet 18 includes traditional 0.25 inch (0.64 centimeters) diameter tube 26 connected to heater 12 by converging tube section 28, in addition to electrically conductive earthing and bonding area 24. Thus, aluminum tube 12 and air heater 14 can be fitted into standard 0.25 inch (0.64 centimeters) diameter tubing used in conjunction with servo valves.

FIG. 1B shows a cross section of FIG. 1A along line 1-1. FIGS. 1C AND 1D show a cross section of FIG. 1A along line 2-2, which is closer to the input of tube 12 than line 1-1. Aluminum tube 12 and heater 14 can be seen in more detail in FIG. 1B. Additionally, fins 32 inside aluminum tube 12 can be seen. These fins 32 can be of various shapes that promote heat exchange into air moving through air supply line 10, such as triangular fins. The density of fins 32 can change depending on the location within aluminum tube 12. For instance, the density of fins 32 can be consistent throughout, or can increase from input to output of tube 12 as shown in FIG. 1C. Conversely, the density of fins 32 can decrease from input to output, as shown in FIG. 1D, depending on temperature control needs.

FIG. 2 is a cross section schematic view of wall 40 around aluminum tube 12 from FIGS. 1A-1B. Wall 40 connects aluminum tube 12 to heater 14. Wall 40 includes pressure sensitive adhesive 42, first polyimide layer 44, heater 14, second polyimide layer 46, epoxy adhesive 48, shrink jacket 50, and thermal insulation layer 52.

Supply air flows through Aluminum tube 12, which has a diameter D of 1 inch (2.54 centimeters) and a length L of 6.5 inches (16.51 centimeters). Aluminum tube 12 is wrapped in first polyimide layer 44, attached by pressure sensitive adhesive (PSA) 42. First polyimide layer 44 is around 0.003 inches (0.008 centimeters) in thickness and can be Kapton®. First polyimide layer 44 is thermally stable. Pressure sensitive adhesive 42 is around 0.005 inches (0.001 centimeters) thick and secures first polyimide layer 44 to aluminum tube 12.

Heater 14 is attached to first polyimide layer 44 opposite aluminum tube 12, and is only about 0.002 inches (0.0005 centimeters) thick. Heater 14 is a metallic material, such as stainless steel. Heater 14 can be made of an elemental metal or any alloy. Heater 14 is attached to second polyimide layer 46 opposite first polyimide layer 44. Second polyimide layer 46 can also be, for example, Kapton®. First and second polyimide layers 44, 46, have good mechanical elongation and tensile strength, and maintain good adhesion with metallic heater 14. Heater 14 is attached to a thermostat (not pictured).

Shrink jacket 50 is attached to second polyimide layer 46 opposite heater 14 by epoxy adhesive 48. Shrink jacket 50 also provides corrosion protective coating for aluminum tube 12. Shrink jacket 50 can be about 0.095 inches (0.24 centimeters) thick, and may be made of commercially available material, for example, DR25 Raychem®. Thermal insulation layer 52 is attached to shrink jacket 50 opposite second polyimide layer 46. Thermal insulation layer 52 prevents heat lost from wall 40. Thermal insulation layer is thick, about 0.25 inches (0.64 centimeters). Thermal insulation layer can be made of Zotek F 38 HT®, for example, or other suitable aerospace grade thermal insulation.

Wall 40 resistance and dielectric withstanding voltage properties of air supply line 10 are key to long term life and reliability. The adverse aircraft environment of this heater application related to altitude variation (pressure fluctuation), temperature variation, humidity and salt exposure makes the sealing of the heater vital to heater 14 life. If environmental sealing is insufficient, contamination may migrate into the heater lamination and create de-bonded materials, or actual conductive paths to ground.

FIG. 3 is a flow chart depicting method 54 of making an air heater. Method 54 includes step 56, decreasing velocity of the air flow by increasing the diameter of the air supply, and step 58, heating the air supply line with a metallic heater element. Combined, these steps allow for temperature control of a feed air supply flowing towards a servo valve.

In step 56, the diameter of a tube in a feed air supply line in increased to at least one inch. Compared to standard tubing diameters of 0.25", this allows for an increased diameter and decreased air velocity. This results in more heat transfer to air running through the feed air supply line.

In step 58, the air supply line is heated with a metallic heater element. The metallic heater element is a sheet heater element that can be wrapped around a tube of the feed air supply line, warming a portion of the feed air supply line. This can be accomplished by wrapping a wall structure around the tube. The heating wall assembly can include a first polyimide layer attached to the aluminum tube, the a heating element, a second polyimide layer wrapped around the heating element opposite the first polyimide layer, a shrink jacket attached to the second polyimide layer opposite the heating element, and a thermal insulation layer attached to the shrink jacket opposite the second polyimide layer. These elements are discussed in detail with reference to FIG. 2.

Increasing the diameter of an aluminum tube in an air supply line allows for greater heat exchange in supply air. Additionally, adding fins inside the tube promotes transfer of heat into the supply air. Finally, creating the wall structure, including a metallic heater, around the aluminum tube, allows for continual heating and temperature regulation of supply air running through the aluminum tube. This prevents freezing of the supply line and prevents freezing of downstream valves.

Discussion of Possible Embodiments

The following are non-exclusive descriptions of possible embodiments of the present invention.

An air supply line includes a tube with a diameter of at least one inch, a network of fins located within the tube, and a heater wrapped around the tube.

The air supply line of the preceding paragraph can optionally include, additionally and/or alternatively, any one or more of the following features, configurations and/or additional components:

The heater is attached to the tube with a pressure sensitive adhesive.

The air supply line includes a first polyimide layer between the tube and the heater.

The air supply line includes a second polyimide layer attached to the heater opposite the first polyimide layer.

The air supply line includes a shrink jacket opposite the tube attached to the heater.

The shrink jacket is attached to the heater by an epoxy adhesive.

The air supply line includes a thermal isolation layer attached to the heater opposite the tube.

The heater has a length of six inches.

The heater comprises a resistive metal alloy.

The tube has a thickness of 0.035 inches.

An air heater assembly includes a tube configured to receive supply air and having a diameter of at least one inch a first polyimide layer wrapped around an external surface the tube, adhered to the tube by a pressure sensitive adhesive, a heating element wrapped around the first polyimide layer opposite the external surface of the tube, a second polyimide layer wrapped around the heating element opposite the first polyimide layer, a shrink jacket attached to the second polyimide layer opposite the heating element by an epoxy adhesive, and a thermal insulation layer attached to the shrink jacket opposite the second polyimide layer.

The air heater assembly of the preceding paragraph can optionally include, additionally and/or alternatively, any one or more of the following features, configurations and/or additional components:

The first and second polyimide layers are polyimide films.

The heater element is comprised of a material selected from the group of aluminum, copper, stainless steel, titanium, and their alloys.

A method of temperature controlling an air flow in an air supply line includes decreasing velocity of the air flow by increasing the diameter of the air supply line to at least one inch, and heating the air supply line with a metallic heater element, the heater element wrapped around the air supply line.

The method of the preceding paragraph can optionally include, additionally and/or alternatively, any one or more of the following features, configurations and/or additional components:

Heating the air supply line comprises building a heating wall assembly wrapped around the air supply line, the heating wall assembly comprising a first polyimide layer attached to the air supply line, the a heating element, a second polyimide layer wrapped around the heating element opposite the first polyimide layer, a shrink jacket attached to the second polyimide layer opposite the heating element, and a thermal insulation layer attached to the shrink jacket opposite the second polyimide layer.

The method includes promoting heat exchange in the air flow by including fins inside the air supply line.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof.

Therefore, it is intended that the invention not be limited to the particular embodiment(s) disclosed, but that the invention will include all embodiments falling within the scope of the appended claims.

The invention claimed is:

1. An air supply line comprising:
   a tube comprising:
   an inlet having a first diameter of no more than 0.25 inches;
   an outlet having a second diameter of no more than 0.25 inches; and
   a central portion having a third diameter of at least one inch, wherein the central portion connects the inlet and the outlet;
   a network of fins located within the tube;
   a first polyimide layer wrapped around the tube, adhered to the tube by a pressure sensitive adhesive; and
   a heater wrapped around the first polyimide layer.

2. The air supply line of claim 1, further comprising a second polyimide layer attached to the heater opposite the first polyimide layer.

3. The air supply line of claim 1, further comprising a shrink jacket opposite the tube attached to the heater.

4. The air supply line of claim 3, wherein the shrink jacket is attached to the heater by an epoxy adhesive.

5. The air supply line of claim 1, further comprising a thermal isolation layer attached to the heater opposite the tube.

6. The air supply line of claim 1, wherein the heater has a length of six inches.

7. The air supply line of claim 1, wherein the heater comprises a metal.

8. The air supply line of claim 1, wherein the tube has a thickness of 0.035 inches.

9. The air supply line of claim 1, wherein the network of fins comprises a plurality of triangular fins.

10. The air supply line of claim 9, wherein the density of the plurality of fins is consistent between the inlet and the outlet.

11. The air supply line of claim 9, wherein the density of the plurality of fins increases between the inlet and the outlet.

12. The air supply line of claim 9, wherein the density of the plurality of fins decreases between the inlet and the outlet.

13. An air heater assembly, comprising:
   a tube configured to receive supply air, the tube comprising:
   an inlet for receiving fluid having a first diameter;
   an outlet for expelling fluid having a second diameter; and
   a central portion connecting the inlet and the outlet, the tube having a third diameter at least four times of the first diameter and at least four times the second diameter; and
   a first polyimide layer wrapped around an external surface the central portion, adhered to the central portion by a pressure sensitive adhesive;
   a heating element wrapped around the first polyimide layer opposite the external surface of the central portion;
   a second polyimide layer wrapped around the heating element opposite the first polyimide layer;
   a shrink jacket attached to the second polyimide layer opposite the heating element by an epoxy adhesive; and
   a thermal insulation layer attached to the shrink jacket opposite the second polyimide layer.

14. The air heater assembly of claim 13, wherein the first and second polyimide layers are comprised of polyimide films.

15. The air heater assembly of claim 13, wherein the heater element is comprised of a material selected from the group of aluminum, copper, stainless steel, titanium, and their alloys.

16. A method of temperature controlling an air flow in an air supply line comprising:
   introducing airflow into the air supply line through an inlet having a first diameter;
   moving airflow from the inlet to a central portion have a second diameter at least four times the first diameter;
   heating airflow in the central portion with a metallic heater element wrapped a first polyimide layer wrapped around an external surface of the central portion, wherein the first polyimide layer is adhered to the central portion by a pressure sensitive adhesive; and
   moving airflow through an outlet having a third diameter equivalent the first diameter.

17. The method of claim 16, further comprising moving airflow through a plurality of fins located inside the central portion to create turbulence.

18. The method of claim 17, wherein the density of the plurality of fins is consistent between the inlet and the outlet.

19. The method of claim 17, wherein the density of the plurality of fins increases between the inlet and the outlet.

20. The method of claim 17, wherein the density of the plurality of fins decreases between the inlet and the outlet.

* * * * *